No. 635,300. Patented Oct. 24, 1899.
G. H. CONDICT.
POSITIONING APPARATUS FOR MOTOR VEHICLES.
(Application filed Feb. 7, 1899.)
(No Model.) 2 Sheets—Sheet 1.
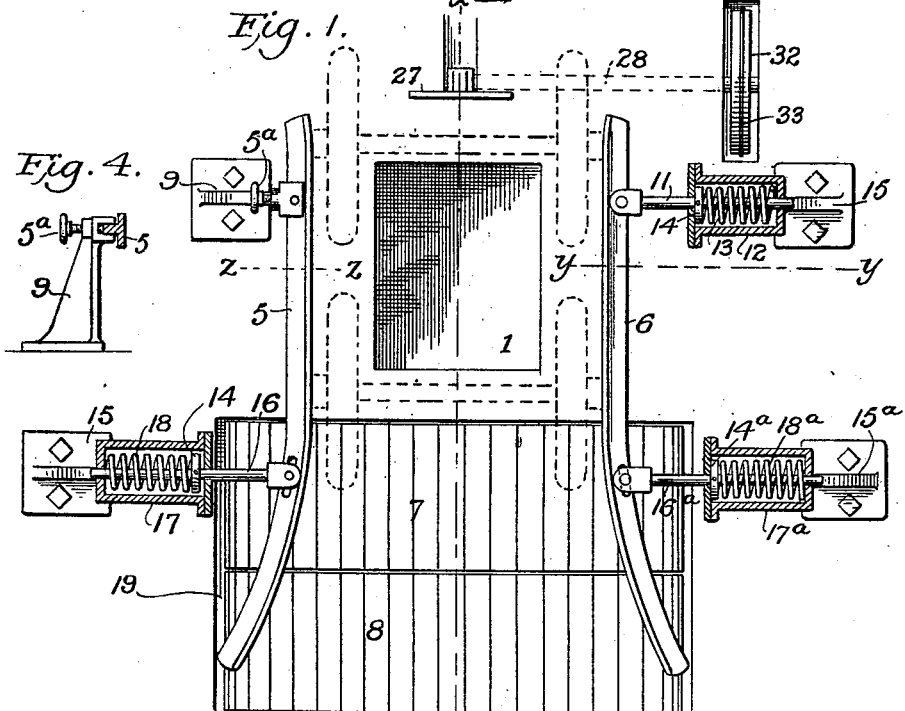
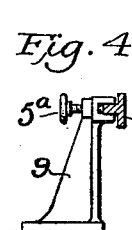
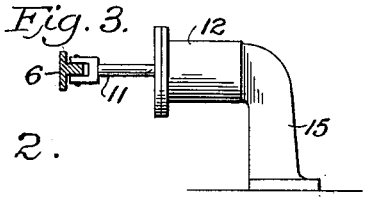
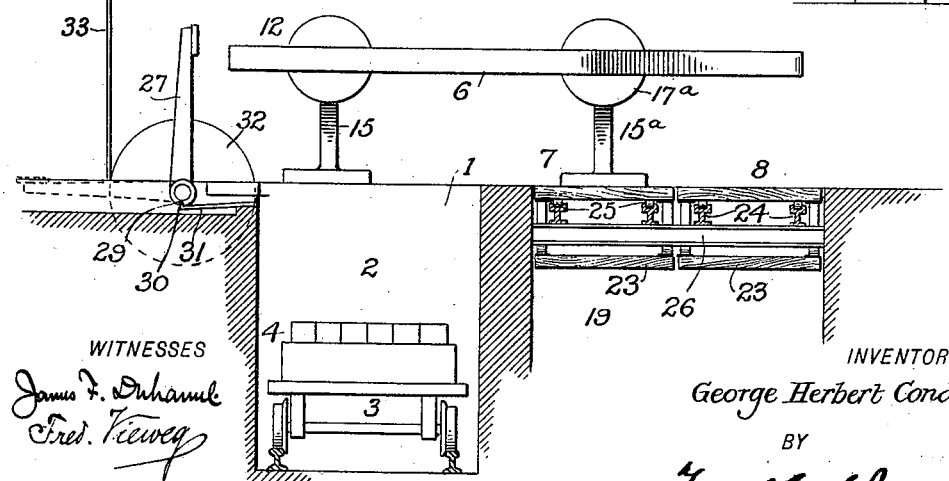
WITNESSES
James F. Duhamel
Fred Vieweg
INVENTOR:
George Herbert Condict,
BY
Frankland Jannus
ATTORNEY
THE NORRIS PETERS CO., PHOTO-LITHO., WASHINGTON, D. C.

No. 635,300. Patented Oct. 24, 1899.
G. H. CONDICT.
POSITIONING APPARATUS FOR MOTOR VEHICLES.
(Application filed Feb. 7, 1899.)
(No Model.) 2 Sheets—Sheet 2.
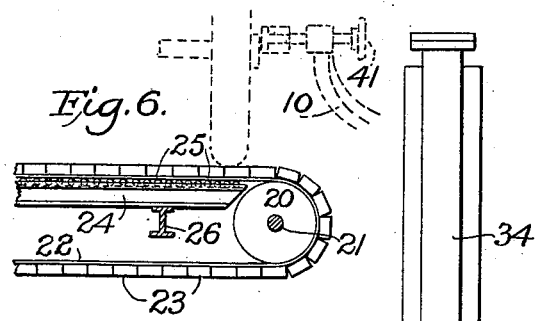
Fig. 6.
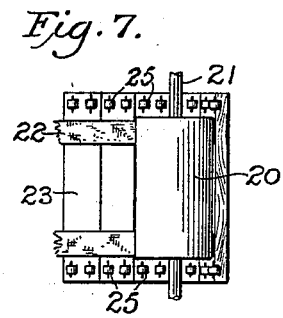
Fig. 7.
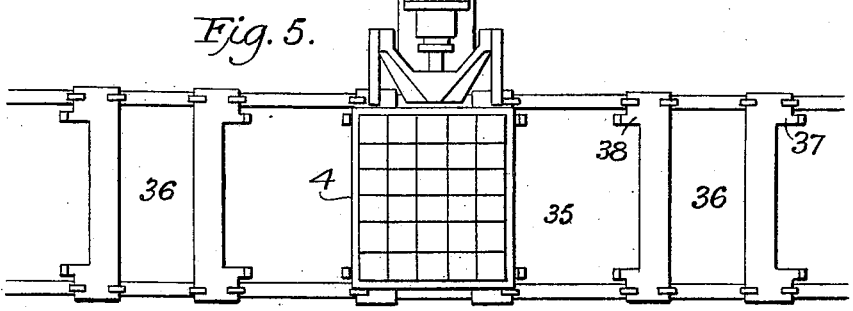
Fig. 5.
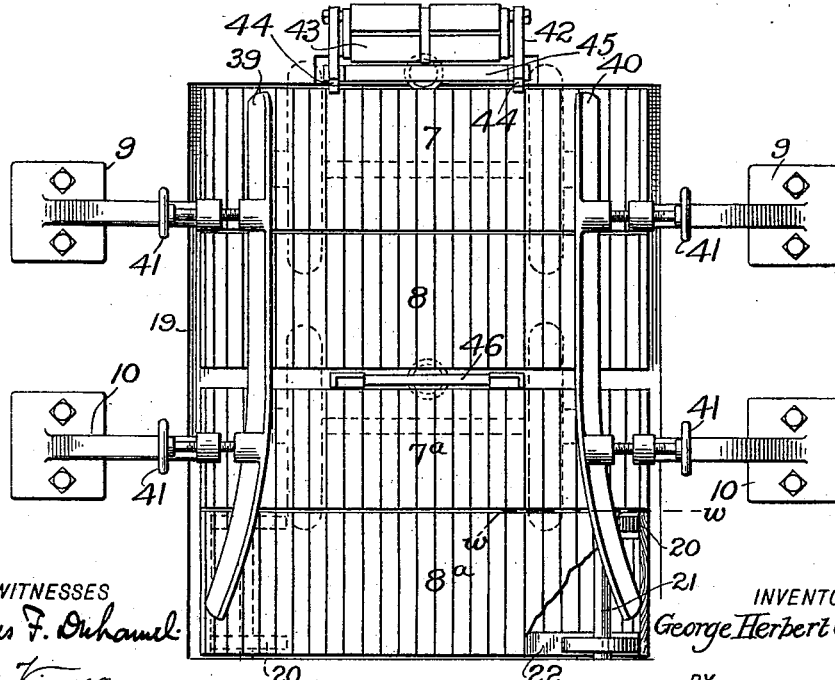
WITNESSES
James F. Duhamel
Fred. Vieweg
INVENTOR
George Herbert Condict,
BY
Frankland James
ATTORNEY

UNITED STATES PATENT OFFICE.

GEORGE HERBERT CONDICT, OF NEW YORK, N. Y., ASSIGNOR TO THE ELECTRIC VEHICLE COMPANY, OF SAME PLACE.

POSITIONING APPARATUS FOR MOTOR-VEHICLES.

SPECIFICATION forming part of Letters Patent No. 635,300, dated October 24, 1899.

Application filed February 7, 1899. Serial No. 704,840. (No model.)

*To all whom it may concern:*

Be it known that I, GEORGE HERBERT CONDICT, a citizen of the United States of America, and a resident of the city of New York, county of New York, and State of New York, have invented certain new and useful Improvements in Positioning Apparatus for Motor-Vehicles, of which the following is a specification.

My invention relates to apparatus whereby a motor-vehicle carrying storage batteries is directed into proper position with respect to mechanical loading and unloading apparatus, so that a tray of exhausted batteries may be removed therefrom and replaced by a tray which has been charged and is ready for use.

The details of the improvement will be fully hereinafter pointed out, and referred to in the appended claims.

In the accompanying drawings, Figure 1 is a plan view of the loading-table and positioning apparatus, the wheels of the vehicle being indicated in dotted lines. Fig. 2 is a vertical longitudinal sectional elevation on the line X X, Fig. 1. Fig. 3 is a detail view in elevation, partly in section, on the line Y Y, Fig. 1. Fig. 4 is a detailed view in elevation on the line Z Z, Fig. 1. Fig. 5 is a plan view of the arrangement when adapted to load the vehicle horizontally instead of from below. Fig. 6 is a sectional elevation of a part of the loading-platform on the line W W, Fig. 5. Fig. 7 is an inverted plan view of an end of one section of the loading-platform.

In the drawings, 1 is an opening over a pit 2, into which is moved a truck 3 or other suitable device for handling a tray 4 of storage batteries to be elevated into attachment with the vehicle.

5 and 6 are guide-bars, preferably of metal, supported at about the height of the hubs of the vehicles, one on each side of and parallel with the opening 1. In front of the opening the bars 5 6 curve outwardly, increasing the space for receiving and guiding the vehicles into position. Under the curved portions of the bars is a laterally-movable table, which may be in any desired number of adjacent sections 7 8.

The bar 5 is pivotally secured at its inner end in a stationary adjustable holder carried by bracket 9, attached to the floor, the outer curved portion being pivotally connected to a rod 16, which passes through the cylinder 17, sustained by bracket 15 and containing buffer-spring 18, which acts against the rear end of the cylinder, and a collar 14, secured to rod 16. With this construction the curved end of the bar is normally held in the desired position, but will yield when struck by the wheel of the vehicle moving into position, the spring 18 reacting to force the rod, bar, and vehicle, which is then upon the lateral movable table, toward the center. The opposite bar 6 is supported at its inner end by pivotal connection with piston-rod 11 of a similar cylinder 12, mounted on bracket 15, Fig. 3, and containing a somewhat shorter and stiffer spring 13, bearing against collar 14 of rod 11. The curved end of the bar 6 is supported by a second piston-rod $16^a$, similar to that connected with bar 5 on the opposite side of the table and just referred to. The rod $16^a$ passes through cylinder $17^a$, mounted upon bracket $15^a$, and contains spring $18^a$, reacting against collar $14^a$ on said rod. The springs 18 $18^a$ are buffers and of about even strength and act as cushions when the wheels of the vehicles strike the bars 5 6.

The table 7 8, Fig. 1, is supported on the same level as the adjacent floor in a pit 19 and comprises a number of endless belts extending between rollers on opposite sides of the pit and outside of the guide-bars. As indicated in Fig. 6, the rollers 20 are mounted upon a suitable shaft 21 and carry the bolts 22, which are provided upon their exterior with slats 23 to give the desired stability. Between the end rollers 20 and extending across the pit are rails 24, which may be channeled on their upper surfaces to carry a series of small rollers 25, upon which the ends of the slats 23 of each belt are supported to prevent sagging. The rails 24 may, however, have flat treads and the rollers 25 be attached individually to the under sides of the slats 23 beyond the edges of the belts, as shown in Fig. 7, which should then be narrower to insure free passage to the rollers. The rails 24 are supported by girders 26.

In operation should either of the front wheels of the vehicle strike the outwardly-curved portion of the bars 5 or 6 as it is moving into position they will easily be deflected sidewise by movement of the table 7 8, upon which they then are. Any excess of movement of the vehicle in the direction of the bars 5 or 6 will be taken up by the buffer-springs, which, reacting, will push the vehicle upon the table toward the center and so direct it while continuing to advance into loading position between the parallel portions of the bars 5 6. The spring 13 is shorter or stiffer than the spring 18ª holding the other end of the bar 6. Consequently the piston-rod 11 normally serves only as a pivotal support; but should a vehicle be wider than the standard the spring 13 will yield sufficiently to allow it to pass from between the bars 5 6, thereby avoiding damage thereto or delay in the loading operation. A lateral adjusting-screw 5ª may also be provided between the bar 5 and its supporting-bracket 9.

In the use of the apparatus, Figs. 1 and 2, the vehicle after receiving attention may be backed out over the table 7 8 or it may pass onward over the opening 1. As a guide to the driver to stop the vehicle in proper position over pit 2, I provide a movable stop 27, which may consist of a board of the necessary height mounted upon a transverse shaft 23, formed with notch 29, which when the stop is in vertical position is engaged by a detent 30, carried by spring 31. The axis 28 extends laterally out of the path of the vehicle and is provided with a pulley 32, to the periphery of which is connected a rope 33, that is carried up over suitable guides to a position within reach of the driver on the vehicle. When the vehicle comes over the pit 2, the driver pulls upon the cord 33, which, through pulley 32, rotates the axis 28 and turns the stop 27 to vertical position. The stop 27 is not designed to physically arrest the movement of but to indicate the point at which the vehicle should be brought to a halt. If the vehicle leaves in forward direction, it pushes against the stop, forcing out the detent 30, when the stop falls to the floor out of the way.

In Fig. 5 the vehicle is arranged to be loaded horizontally instead of vertically. I have therefore shown without claiming the horizontally-moving ram, a section of the transfer-table, and the leveling-rams, as illustrated, described, and claimed in my pending application, Serial No. 693,985, filed October 19, 1898. With this arrangement the vehicle is run onto the loading-table 7 8 and placed in position laterally. It is then leveled by the vertically-moving rams 45 46 and the load (tray of batteries) inserted or withdrawn in a horizontal plane by the loading-ram 34 in connection with the transfer-table 35, which is provided with a number of carriers 36, each adapted to receive between its arms 37 38 a tray of storage batteries 4, and which are then moved laterally away from the vehicle, so as to carry the exhausted battery away in a lateral direction, at the same time bringing a freshly-charged battery into the loading position. The ram 34 then pushes the charged battery into the vehicle, after which it is backed off and away from the loading-table. With this arrangement the opening 1 is not needed, and I prefer to make the entire loading-table of a series of endless belts 7 8 7ª 8ª, although part of them may be omitted, as in Fig. 1. The table moves laterally as the vehicle is directed by the positioning-bars 39 40 at the sides, which are substantially like those shown in Fig. 1, but are stationary, as they may be in that instance also. Adjusting-screws 41 are provided between bars 39 40 and their supports 9 10 to accommodate vehicles of varying width.

The vehicle when moving onto the loading-table is capable of moving laterally with entire freedom, together with the transverse endless belts, so that should it strike the curved portions of the positioning-bars it will be deflected toward the center until it runs in between the parallel portions thereof, when it will be laterally in correct position.

A bridge attached to the transfer-table acts as a stop for the vehicle, and a set of rollers 43, carried by the bridge, as set forth in my said prior application, serves to sustain and guide the tray of batteries in passing between the transfer-table and the interior of the vehicle. Hinged hooked arms 44 at the sides of the bridge engage and hold the end of the vehicle which is raised up level with the loading apparatus by vertical ram 45. Another vertical ram 46, rising between sections 7ª 8 of the loading-table, raises the other end to correspond.

While I have described the structure shown in the drawings, it will be apparent that in view of the foregoing and of the nature and object of the invention many of the details may be varied without departing therefrom.

Having described my invention, what I claim is—

1. An automatic positioning apparatus for vehicles comprising a pair of guide-bars and a laterally-movable floor or support between said bars, whereby the vehicle is automatically carried laterally into position while passing longitudinally between the guide-bars.

2. The combination with a vehicle to be loaded, of a pair of guide-bars one on each side of the vehicle and between which the vehicle is guided into the desired position, and a laterally-movable sectional support between the bars and upon which the vehicle is carried laterally into the desired position.

3. The combination with a vehicle to be placed in position of a pair of guide-bars, one on each side of the vehicle and between which it is positioned, of a movable floor composed of a plurality of endless belts upon which the vehicle travels into position between the bars, the belts supporting the vehicle moving with the vehicle as the same is guided into position between the bars.

4. The combination with longitudinally-disposed guide-bars, of a table or platform comprising a plurality of endless belts arranged transversely of the bars, end rollers carrying said belts and intermediate antifrictional supports arranged to sustain the upper part of the belt in horizontal position.

5. The combination with a vehicle to be loaded, of a pair of guide-bars parallel along a portion of their length and curving outwardly, laterally-yielding spring-supports for the bars, and an end stop adjacent to the parallel portion of said bars.

6. The combination with a loading-pit, guide-bars at each side thereof, a radially-movable stop and a spring-detent for holding the same in operative position, and means for moving said stop into operative position from a distance.

7. The combination with a vehicle to be loaded and an opening through which the load is moved vertically, of a pair of guide-bars arranged parallel to said opening on either side thereof and flaring outwardly, laterally-adjustable supports for the bars and a laterally-movable table under the flaring ends of the guide-bars.

8. The combination with a motor-vehicle, an opening through which the load is moved vertically, a stationary bar at one side parallel along the opening and curving outwardly at its front end, a similar bar at the opposite side pivotally supported and provided at its outer end with a laterally-moving spring, a laterally-moving table under the outwardly-curved portions of the bars and a position-indicating stop beyond said loading-opening.

Signed by me at New York, N. Y., this 6th day of February, 1899.

GEORGE HERBERT CONDICT.

Witnesses:
S. G. HYATT,
FRANKLAND JANNUS.